United States Patent [19]

Hughes

[11] Patent Number: 4,570,998
[45] Date of Patent: Feb. 18, 1986

[54] MOTORCYCLE BACKREST SEAT

[76] Inventor: Jerry J. Hughes, 2475 Tusitala, No. 2, Honolulu, Hi. 96815

[21] Appl. No.: 672,615

[22] Filed: Nov. 19, 1984

[51] Int. Cl.$^4$ .................. B60N 1/06; A47C 1/02; B62J 1/00
[52] U.S. Cl. .................. 297/353; 297/DIG. 9; 297/195; 297/366
[58] Field of Search .................. 297/353, 195, DIG. 9, 297/383, 352, 366

[56]  References Cited

U.S. PATENT DOCUMENTS

| | | | |
|---|---|---|---|
| 1,102,899 | 7/1914 | Fox | 297/195 |
| 2,966,938 | 1/1961 | Ooten | 297/376 X |
| 3,698,762 | 10/1972 | Gorman | 297/195 |
| 3,887,231 | 6/1975 | Bochynsky | 297/DIG. 9 X |
| 3,940,166 | 2/1976 | Smithea | 297/DIG. 9 |
| 4,032,189 | 6/1977 | Benavente | 297/DIG. 9 X |
| 4,313,639 | 2/1982 | Ware | 297/366 |
| 4,466,660 | 8/1984 | Mabie | 297/195 |

*Primary Examiner*—William E. Lyddane
*Assistant Examiner*—Peter A. Aschenbrenner
*Attorney, Agent, or Firm*—Pravel, Gambrell, Hewitt & Kimball

[57]  ABSTRACT

A combined motorcycle backrest and passenger seat is pivotally movable from a backrest position for the operator to a seat position for a passenger.

1 Claim, 5 Drawing Figures

MOTORCYCLE BACKREST SEAT

BACKGROUND OF THE INVENTION

The present invention relates to motorcycles, more specifically backrests for motorcycle operators.

It is desirable for motorcycles to be equipped with a backrest for the operator, primarily to support his lower back and delay the effects of road fatigue. To this end, several types of devices have been developed.

One known backrest incorporates a movable backrest attached to a carrier rack mounted behind the motorcycle seat. The backrest is clamped to the carrier rack in such a fashion that the backrest can be moved forward or backwards to provide an appropriately placed backrest for either the rider or the passenger. This system had the disadvantage of requiring relatively long arms from the backrest to the carrier rack. When the backrest was positioned in the rider position, the backrest mounting was relatively flexible. When the backrest was in the passenger position, the supports extended a distance behind the carrier rack and created possible clearance problems.

A second approach used a back rest firmly attached to a carrier rack mounted behind the seat. In this case, the entire carrier rack pivoted backward or forward to position the backrest as desired for the rider or the passenger. In either of these two systems, it was impossible to use the backrest in the rider's position when carrying a passenger.

A third type was a small backrest that mounted to the seat in a position to form a backrest for the rider. This type of bracket was not adjustable beyond a relatively narrow range. It was designed exclusively for the rider and takes up space that could be used for a passenger and must be removed to alleviate this problem.

It is also desirable to have the passenger slightly elevated over the rider to give the passenger greater visibility. This has not been easily accomplished in the past, generally requiring specially designed seats to accomplish this purpose. Pads or cushions have the problem of being loose and therefore uncomfortable and dangerous.

SUMMARY OF THE INVENTION

The present invention provides a novel apparatus that provides a firm backrest for the rider without reducing the size of passenger space and, at the same time, provides a built in pad to increase the passenger seat height. The present invention is a pivotable backrest and seat pad combination. When pivoted in a forward position, the present invention acts as a stable backrest for the rider. The backrest can be used by the rider when a passenger is being carried. When the supporting arms are released, the backrest pivots back onto the passenger seating area and becomes a firmly affixed pad to increase the seat height for the passenger, thereby giving the passenger greater visibility.

DETAILED DESCRIPTION OF A PREFERRED EMBODIMENT

Figure 1:
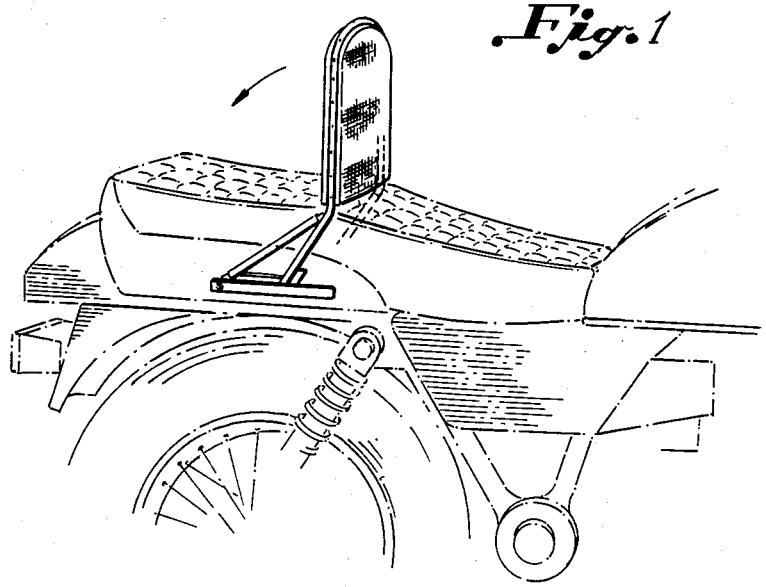
FIG. 1 is a partial perspective view of a motorcycle with a backrest and seat pad combination shown in the backrest position.

Referring to the drawings, the combination backrest and seat pad is designated generally by reference numeral 20. FIG. 1 shows the backrest seat 20 mounted on a motorcycle seat 22 of a motorcycle 24 of standard design. FIG. 1 shows the backrest seat 20 in its backrest position.

Figure 2:
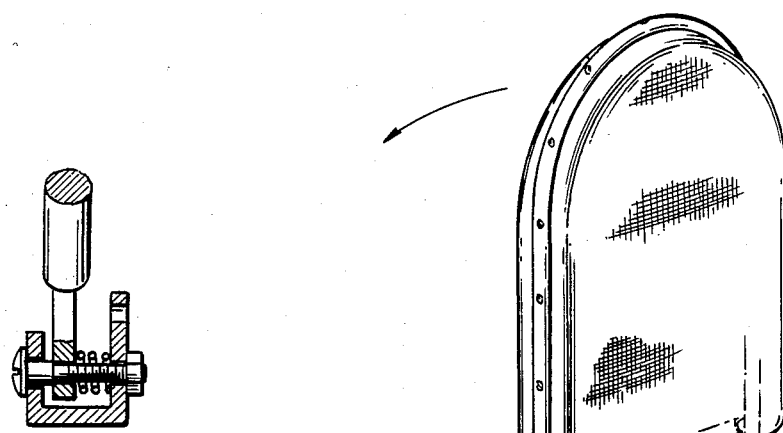
FIG. 2 is a perspective view of the backrest and seat pad combination.

The backrest seat 20 includes a cushion 30 that is connected between a pair of pivot arms 32, as shown in FIG. 2. The pivot arms 32 are referred to as two separate arms but they can be formed from a single piece of material as shown in FIG. 2. The pivot arms 32 are connected to cooperating support arms 34 when the backrest seat 20 is in the upright position of FIGS. 1 and 2. The pivot arms 32 and support arms 34 are all pivotally connected to mounting brackets 36 located on both sides of the motorcycle seat 22. The mounting brackets 36 are attached to the seat 22 through screws 38. In this upright position, the support arms 34 are inserted in openings formed in the pivot arms 32 to support the pivot arms 32 and prevent them from pivoting backwards. The backrest seat 20 can thus be maintained in the vertical or backrest position of FIGS. 1 and 2.

Figure 3:
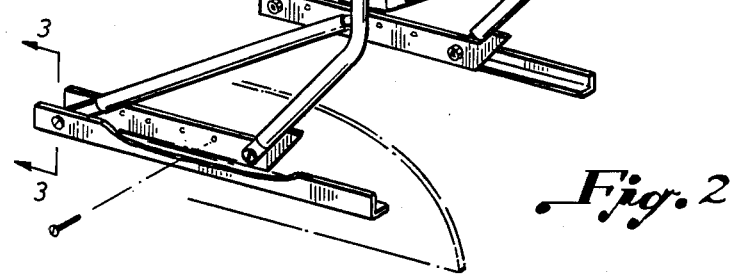
FIG. 3 is a cross-sectional view of a portion of the structure shown in FIG. 2, looking in the direction of a plane line indicated by arrows 3—3 of FIG. 2.
Figure 4:
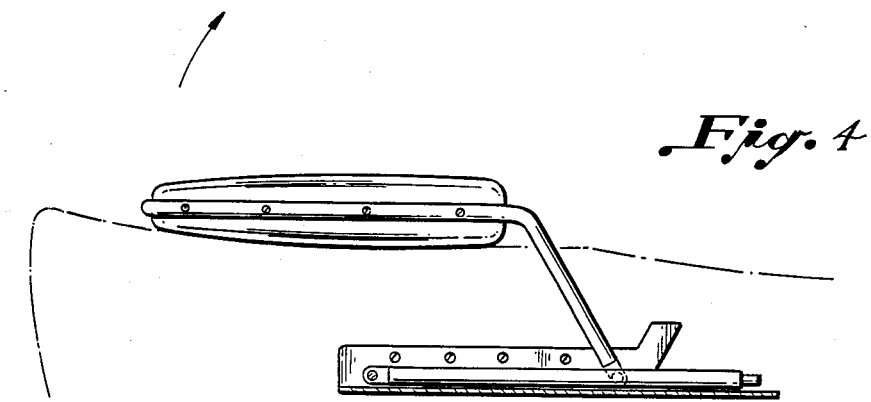
FIG. 4 is a side view of the combination backrest and seat pad in the seat position.
Figure 5:
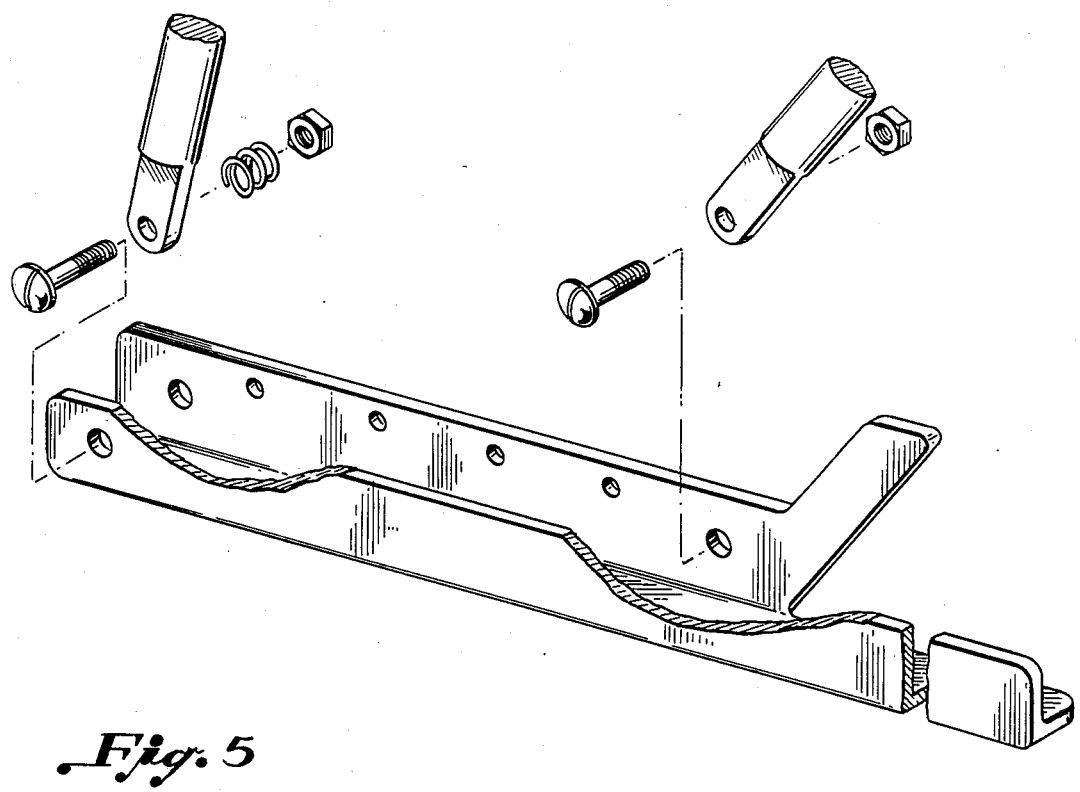
FIG. 5 is an exploded perspective view, in partial cross-section, of a mounting bracket, pivot arm and the support arm of the combination backrest and seat pad.

The pivot arms 32 are connected to the mounting brackets 36 through bolts 50 and cooperating nuts 52, as shown in FIG. 5. The support arms 34 are connected to the mounting brackets 36 through the configuration shown in FIG. 3, which includes a bolt 40, spring 42 and nut 44, so that the support arms 34 can be moved out of the way of the pivot arms 32 when the operator wants to move the backrest seat 20 to the seating position shown in FIG. 4.

The springs 42 operate to bias the support arms 34 toward the outside position of a mounting bracket 36. This bias performs two functions. First, when the support arms 34 are supporting the backrest seat 20 in the backrest position, the support arms 34 are angled slightly inward to contact the pivot arms 32. This angle provides an additional means of lateral support. Without this additional lateral support, the only lateral support for the backrest seat 20 is the resistance of the pivot arms 32 and the mounting brackets 36 to bending.

Second, the biasing of the support arms 34 to the outside by the springs 42 also enables the support arms 34 to be moved to their horizontal position shown in FIG. 4 and not interfere with the pivot arms 32 when the backrest seat 20 is in the seat position as shown in FIG. 4. As shown, the support arms 34 has been removed from their cooperating pivot arms 32 and are supported by the mounting brackets 36.

When the backrest seat 20 is moved from the seat position to the backrest position, the pivot arms 32 are rotated forward and the support arms 34 are rotated upward so that they contact the pivot arms 32 and support them. If the backrest seat 20 is moved from the backrest position to the seat position, the backrest seat 20 is moved slightly forward, the support arms 34 are removed from the pivot arms 32, the support arms 34 are moved to their position on the mounting brackets 36 and the pivot arms are pivoted backward until the pad 30 contacts the seat 22.

By providing a combined backrest and seat of the foregoing design, a motorcyclist can choose to use a back support while riding. When in use, the backrest is provided with extra support by biasing its support arms out of alignment with the prior arms, which also allows the support arms to be stored in a convenient location when the backrest is converted to a pad for elevating a passenger so that he/she can see over the operator.

The foregoing disclosure and description of the invention are illustrative and explanatory thereof, and various changes in the size, shape and materials as well as in the details of the illustrated construction may be made without departing from the spirit of the invention, all such changes being contemplated to fall within the scope of the appended claims.

I claim:

1. A combined backrest and passenger seat for a motorcycle, comprising:

combined backrest and pad means and mounting means for mounting the backrest and pad means on a motorcycle so that the backrest and pad means is selectively movable between a first position that enables the backrest and pad means to operate as a backrest for a motorcycle operator and a second position that enables the backrest and pad means to operate as a passenger seat, the mounting means including a pair of brackets mounted on opposite sides of the motorcycle, a pair of pivot arms mounted on the backrest and pad means and pivotally connected to the brackets, and support arms pivotally connected at one end to the brackets and adapted to be removably connected to the pivor arms for supporting the backrest and pad means in the first position, the support arms being disconnectable from the pivot arms and moved to a storage position so that the backrest and pad means can be moved to the second position, the support arms including means for biasing the end connected to the brackets out of alignment with the pivot arms for providing greater support for the backrest and pad means in the first position and allowing the support arms to be moved to the storage position when the backrest and pad means is moved to the second position without the pivot arms and the support arms interfering with each other.

* * * * *